United States Patent [19]

Androski et al.

[11] Patent Number: 6,041,117
[45] Date of Patent: Mar. 21, 2000

[54] DISTRIBUTED NETWORK CONTROL AND FABRIC APPLICATION INTERFACE

[75] Inventors: Frank J. Androski, Freehold; Nancy Binowski, Bridgewater; James Ehlinger, Colts Neck; Jerry Allen Robinson, Middletown; Daniel Sheinbein, Elizabeth, all of N.J.

[73] Assignee: AT&T Corp, New York, N.Y.

[21] Appl. No.: 08/808,298

[22] Filed: Feb. 28, 1997

[51] Int. Cl.$^7$ .............................. H04M 3/00; H04M 7/00
[52] U.S. Cl. .................... 379/268; 379/219; 379/230; 379/269
[58] Field of Search .................................. 379/230, 201, 379/207, 211, 212, 265, 266, 89, 268, 269, 279, 88.28, 219; 399/32

[56] References Cited

U.S. PATENT DOCUMENTS

| | | | |
|---|---|---|---|
| 5,130,982 | 7/1992 | Ash et al. | 370/85.7 |
| 5,475,737 | 12/1995 | Garner et al. | 379/88.26 |
| 5,481,603 | 1/1996 | Gutirez | 379/221 |
| 5,519,772 | 5/1996 | Akman et al. | 379/265 |
| 5,566,235 | 10/1996 | Hetz | 379/201 |
| 5,568,545 | 10/1996 | Vesterinen | 379/259 X |
| 5,570,410 | 10/1996 | Hooshiari | 379/32 |
| 5,572,583 | 11/1996 | Wheeler et al. | 379/207 |
| 5,610,972 | 3/1997 | Emery et al. | 455/414 |
| 5,664,102 | 9/1997 | Faynberg | 395/200.76 |
| 5,712,903 | 1/1998 | Bartholomew et al. | 379/88.25 |
| 5,729,601 | 3/1998 | Murai | 379/269 |
| 5,864,614 | 1/1999 | Farris et al. | 379/207 |

OTHER PUBLICATIONS

"Managing the CCS #7 Network: An Evolutionary Approach" Datapro, Dec. 1995, pp. 1–9.
"Common Channel Signaling System No. 7" Datapro, Jun. 1996, pp. 1–18.
"Signaling Concepts" Datapro, Jul. 1996, pp. 1–13.
"CCS 7 Offers New Paths to Revenue Generating Services" AT&T Technology, vol. 6, No. 2, 1991, pp. 8–13.
"The 5ESS Switching System: Hardware Design", AT&T Technical Journal, vol. 64, No. 6, Jul.–Aug. 1985, pp. 1417–1437.
"The 5 ESS Switching System: Operational Software", AT&T Technical Journal, vol. 64, No. 6, July–Aug. 1985, pp. 1357–1416.
"Advanced Intelligent Network (AIN) 0.1 Switching Systems Generic Requirements", Technical Reference TR–NWT–001284, Issue 1 Aug. 1992, Bellcore, Redbank, New Jersey pp. 1–3.

*Primary Examiner*—Harry S. Hong
*Attorney, Agent, or Firm*—Robert B. Levy

[57] ABSTRACT

A distributed communications switching system and its associated telecommunications network infrastructure(10) includes a plurality of interconnected switching systems (12$_1$, 12$_2$ and 12$_3$), some of which may be controlled by another switching system and its associated telecommunications network infrastructure. The switching systems are controlled via at least one switch processing platform (16) that generates generic commands for receipt by the switching systems in response to signaling messages received by the SPP. A fabric application interface (19) couples the switching systems to the switch processing platform for distributing generic commands to and from the appropriate switching system and for translating the generic commands into native commands (or vice versa) for execution by the switching system. The fabric application interface also translates signals received at the switching system into generic commands for receipt by the switch processing platform. The ability of the fabric application interface to distribute generic commands to and from the switching systems and to communicate signals received at the switching systems allows the switch processing platform to exercise call control for each switching system regardless of the nature of the call processed thereby, allowing greater flexibility and cost-effective use of application software (both service control and basic call control), and other associated telecommunications network infrastructure such as service circuit equipment.

27 Claims, 6 Drawing Sheets

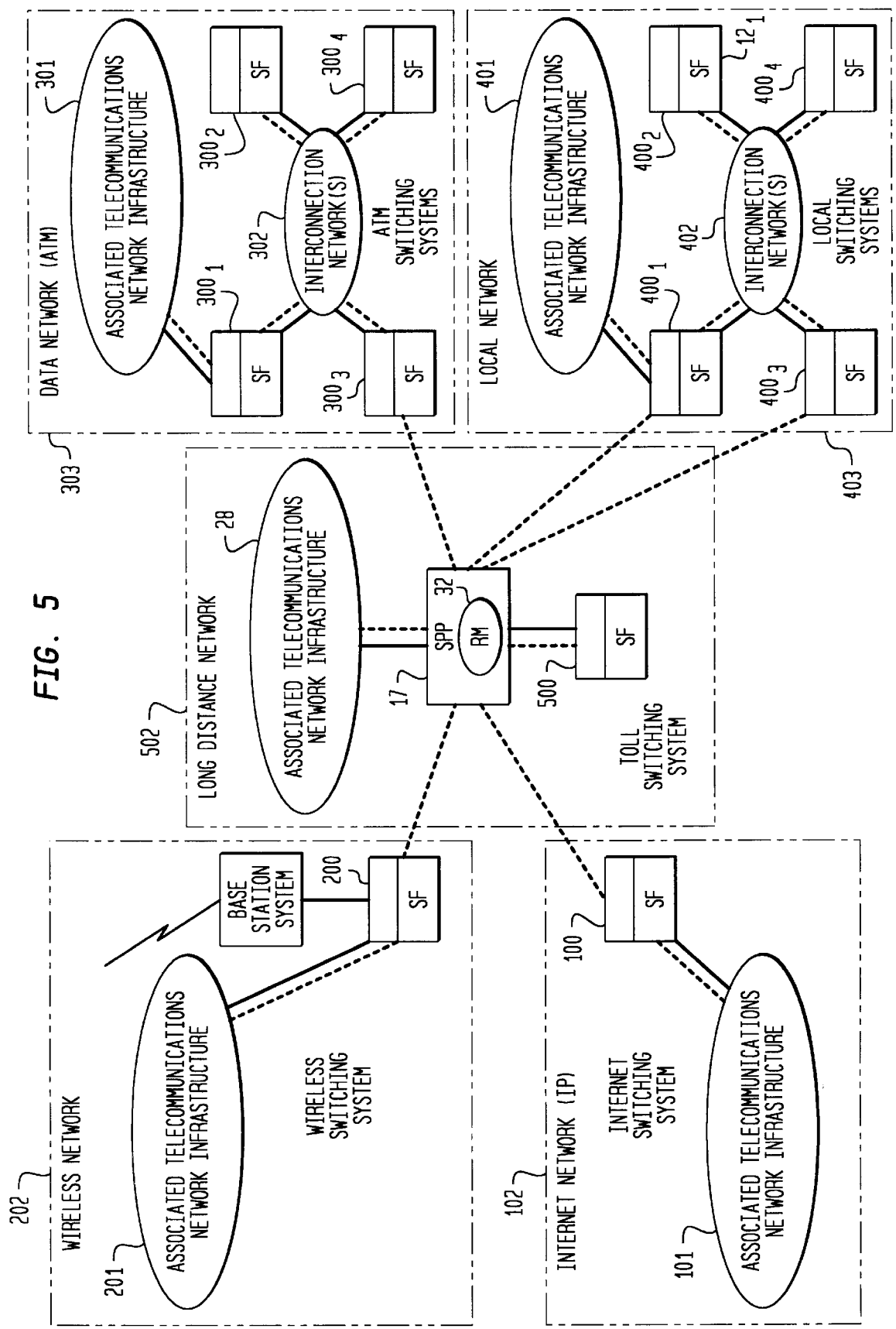

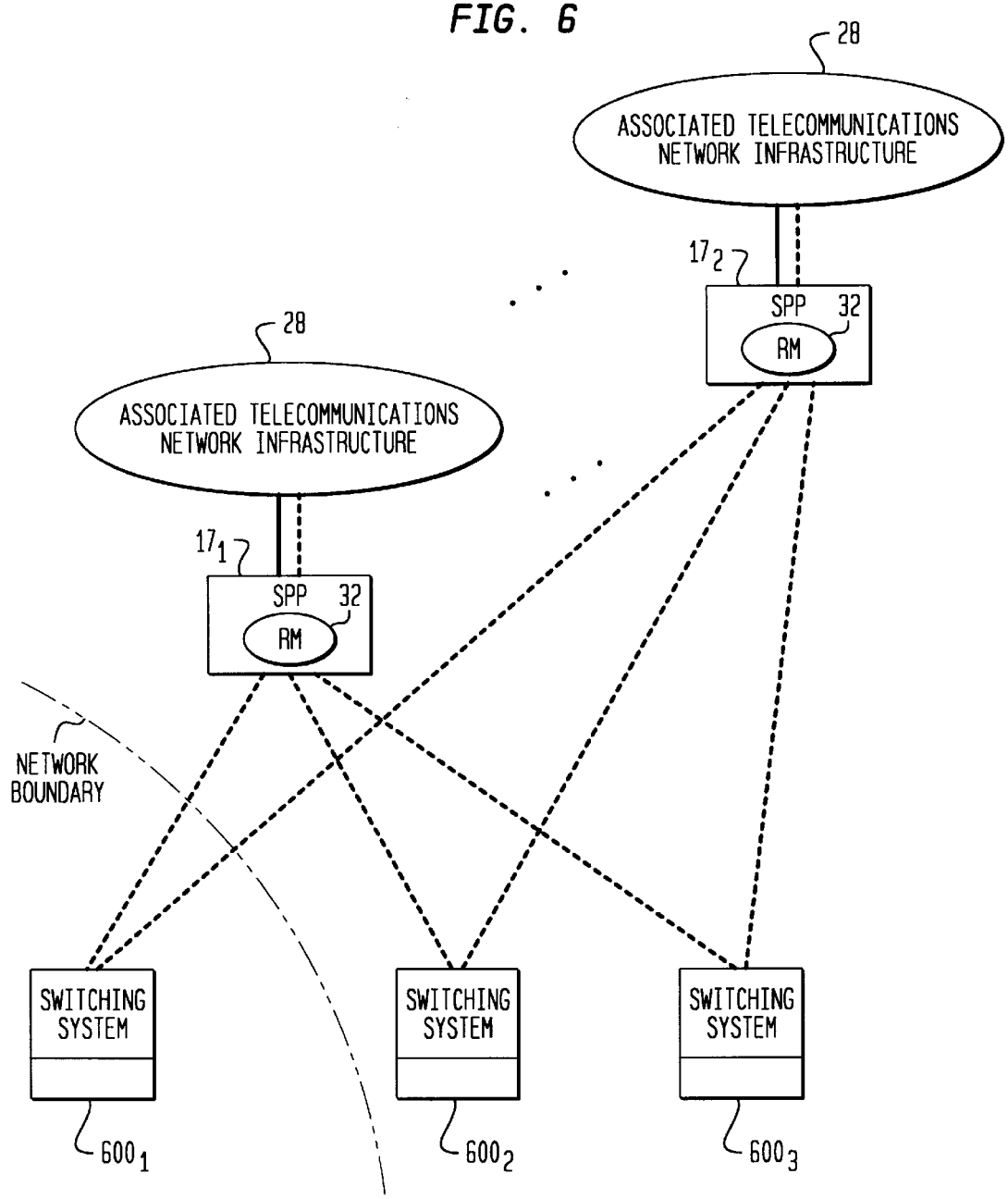

DISTRIBUTED NETWORK CONTROL AND FABRIC APPLICATION INTERFACE

TECHNICAL FIELD

This invention relates to a distributed communications network for processing a variety of calls. In particular this invention applies to both a method and apparatus for the common control of multiple switching systems.

BACKGROUND

Present day telecommunications networks typically include a plurality of switching systems linked via transmission facilities (e.g., trunks and/or channels) that carry "calls" (in the form of voice, video or data) between switching systems. Additionally, these switching systems are typically linked via a signaling (data) network that transmits signaling messages between switching systems. Further, within a given telecommunications network, control information may flow between switching systems and databases, intelligent peripherals, or other specialized resources, as is well known in the art. For the purposes of this invention these databases, intelligent peripherals, or other specialized resources are deemed as the associated telecommunications network infrastructure.

A present day switching system consists of a switching fabric and a control mechanism as a single integrated system. The control mechanism of a switching system provides the intelligence to operate a specific switching fabric and some (or possibly all) of the intelligence to interpret and respond to signals. The switching fabric includes devices for the termination of transmission facilities, as well as devices which provide multiple stages of space and time switching as is understood in the art. Additionally, the switching fabric may also include local intelligence, in the form of a processor or the like, for acting upon commands from the control mechanism. Within prior art switching systems the control mechanism is typically provided by special purpose computers. The basic functions performed by switching systems include connecting communications paths, and to varying degrees, receiving and sending signaling messages, performing operations, administration and maintenance functions, and providing call processing and customer services (e.g., service logic). In the context of this disclosure, the phrase connection functions includes functions such as: receiving dialed digits, determining whether a call can be established, reserving a communication channel, setting up and maintaining the channel, taking down the channel, reserving bandwidth and modifying a resource.

Present day telecommunication networks are typically adapted for specific applications, such as voice, video, or data. These networks differ from one another in various respects, for example, in the transmission method (e.g., circuit, wireless, and packet which should be considered inclusive of various packet methods including packet, cell, and frame relay), used by a call to access the telecommunications network. Further each network typically is comprised of specialized signaling protocols, databases, and transmission facilities. In addition, adding a new application to a present day telecommunications network (for example, adding video capability to a voice telecommunications network) typically requires development of entirely new call processing, signaling, and operational functionality. Moreover, since much of the hardware and software functionality of present day switching systems is dependent on the specific application, it is difficult to add new functionality without massive re-working of the software within the switch.

As the demand for new and enhanced telecommunication services proliferates, there is a need for a telecommunications network architecture that affords greater flexibility at a reduced cost by allowing re-use of existing switching systems and their associated telecommunications network infrastructure.

SUMMARY OF THE INVENTION

In its most general sense, the invention is directed to a novel apparatus and method for providing common control of multiple switching systems. Specifically, the invention comprises a switch processing platform (SPP) and its associated telecommunications network infrastructure and a Fabric Application Interface (FAI) for interfacing the SPP to a plurality of coupled switching systems. Note that these switching systems may be of different types (e.g., local, toll, wireless, ATM, or Internet) and comprised of switching fabrics which may be of different type (e.g., packet or circuit). This invention enables calls with access to a particular telecommunications network (e.g., data, circuit, or wireless) to access common call associated logic.

The invention also provides a method for a separation of call associated logic from connection functions. Call associated logic is the logic within the SPP necessary to process a call, for example, call processing, service logic, signaling message processing, address translation, and routing logic. Examples of connection functions include "reserve", "connect", and "release" associated with reserving a trunk or channel, connecting a trunk or channel, and releasing a trunk or channel, respectively. By ensuring that at least some of the call associated logic is common in the SPP, greater flexibility and cost-effective use of application software is afforded than is available in the switching systems of the prior art.

The SPP (itself, or together with its associated telecommunications network infrastructure) can be constructed to possess the call associated logic necessary for a wide variety of applications, which avoids the need to replicate this logic in each switching system that is coupled to the SPP. For example, a call may originate at an Asynchronous Transfer Mode (ATM) switching system. The ATM switching system sends a request (i.e., a call processing request) to the SPP to invoke the common call associated logic. The SPP processes the request and, in response, commands the ATM switching system to initiate the needed connection functions. It should be noted that in processing the request, the SPP may need to draw on its associated telecommunications network infrastructure or even on the telecommunications network infrastructure associated with one or more other switching systems which may be part of another telecommunications network. Similar common control is achieved for calls originating at various other switching systems (e.g., circuit, wireless, local, or Internet based switching systems). In this manner, different switching systems can all be controlled via a single SPP employing a common call processing methodology. However, it should be noted that to provide common control for calls accessing multiple telecommunications networks (for example, circuit or ATM based) the SPP and its associated infrastructure may need to have the ability to process some information specific to that type of network. For example, addressing based on telephone numbers (ITU-T E.164), or ATM End System Address (ASEA), or the Internet Protocol Address may need to be supported.

To enable the SPP to control the connection functions, a Request Management mechanism distributes generic commands to the appropriate switching system from the SPP. To the extent necessary, a Command Translation mechanism translates generic commands into "native" commands (and vice versa) compatible with the operation of the respective switching system. The communication between the control mechanism within the switching system, and the associated switching fabric could include binary digits in electrical or optical form, electrical signals or a message language that involves native commands. In this regard, native commands are defined to include these, and any other mechanisms that are or could be used for communication between the switching fabric and its associated control mechanism. If the respective switching systems are all capable of accepting generic commands, then translation is not necessary. The translation function enables separation of common control from the connection functions for switching systems of the type that are not capable of accepting generic commands, thus avoiding the need for changes to the common control software when coupling the SPP to switching systems of this type.

The interface between the SPP and the plurality of switching systems, which may or may not be co-located with the SPP, is known as the Fabric Application Interface (FAI). The FAI includes a plurality of links or channels for communicating information between the SPP and the switching systems, as well as the control commands traversing these links. Within each switching system is the fabric platform controller that is a programmed processor or collection of processors that uses native commands to operate the respective switching fabric and perform connection functions. In the preferred embodiment, the FAI communicates generic commands between the switch processing platform and the various switching systems. When the switching systems are responsive to this common set of the generic commands, the type of switching systems being controlled need not be considered by the SPP. As discussed, a Command Translation mechanism may be necessary to translates generic commands into "native" commands (and vice versa) compatible with the operation of the respective switching system.

Centralization of the call processing functions in the SPP affords the advantage of sharing the termination, fabric or service circuit (e.g., announcement, DTMF reception or generation, or automatic speech recognition) resources among the set of switching systems coupled to a given SPP. For example, the SPP can issue a generic command which establishes a communications path between a specialized service circuit integrated with a given switching system to a separate switching system. This is a sharing of resources, in contrast to present day switching systems in which sufficient resources (service circuit and fabric) needed to complete a call typically are required in each switching system.

Additionally, more than one SPP may be employed and each can participate in the control of various switching systems. The participation can take the form of different SPPs controlling different portions of a telecommunications network or, for example, different SPPs being made responsible for specific call associated logic. Further, this partitioning of responsibility for the SPPs is applicable to switching systems and switching systems residing in separate telecommunications networks. The resulting arrangement thus allows for a flexible distributed common control which can be dynamically controlled.

BRIEF SUMMARY OF THE DRAWINGS

FIG. 5 is a block schematic diagram illustrating a second embodiment of a communications network in accordance with the invention; and FIG. 6 is a block schematic diagram illustrating a third embodiment of a communications network in accordance with the invention.

DETAILED DESCRIPTION

Figure 1:
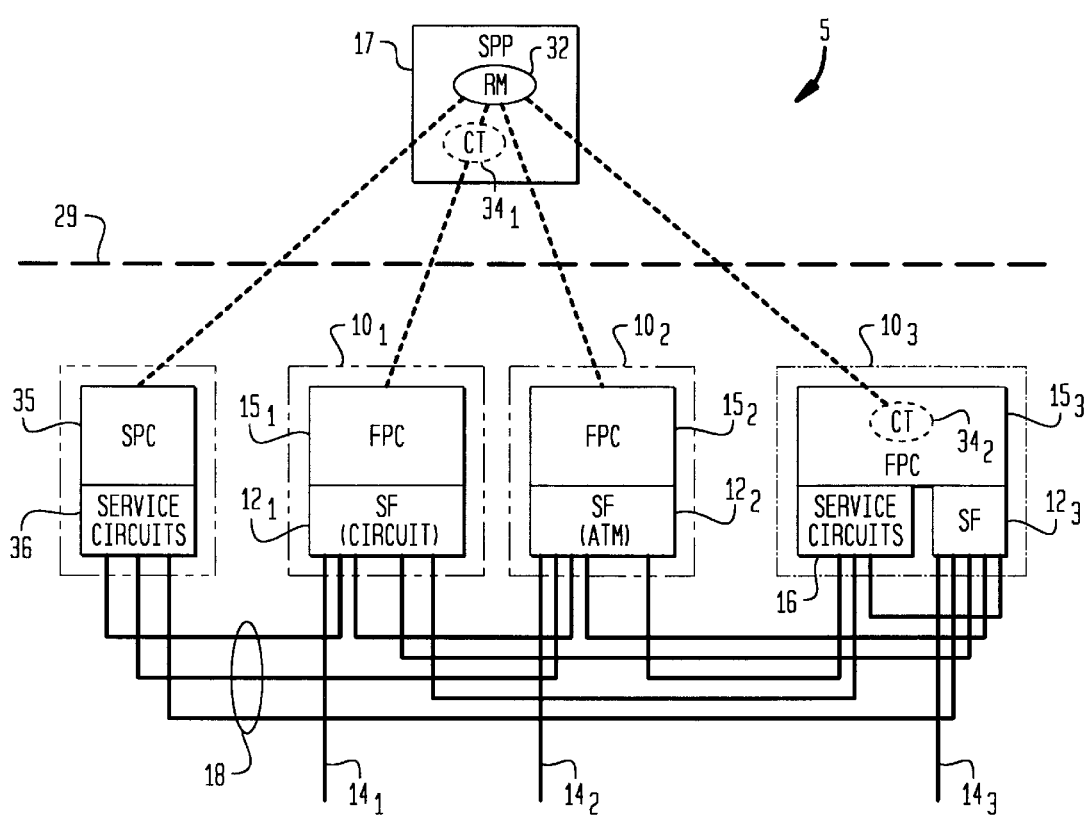
FIG. 1 is a schematic block diagram illustrating a first embodiment of a communications network in accordance with the invention.

FIG. 1 illustrates a block diagram of a first illustrative embodiment network 5 that includes a plurality of switching systems $10_1$, $10_2$ ... $10_n$ (where n is an integer) each with its own integrated switching fabric $12_1$ .. $12_n$, respectively. In the illustrated embodiment, n=3 although a larger or smaller number of switching systems may be provided. The switching fabrics $12_1$–$12_3$ each comprise individual switching devices and terminations (not shown) for connecting communication path sets $14_1$, $14_2$ and $14_3$, respectively, for carrying calls to and from the corresponding switching system to another switching systems. Additionally, the switching fabric may also include local intelligence, in the form of a processor or the like, for acting upon commands received by each switching fabric. In particular, the switching fabrics perform connection functions that include one or more of the following operations: receiving dialed digits, determining whether a call can be established, reserving a communication channel, setting up and maintaining the channel, and taking down the channel. Associated with each of the switching fabrics $12_1$, $12_2$ and $12_3$ is one of fabric platform controllers, $15_1$, $15_2$ and $15_3$, respectively, each in the form of one or more processors for controlling its corresponding switching fabric.

Each of the switching fabrics $12_1$, $12_2$, and $12_3$ is particularly adapted to effectively process and carry a particular type of call and, therefore, the means by which these switching fabrics $12_1$, $12_2$, and $12_3$ establish connections are different. In the illustrated embodiment, the switching system $10_1$ is a circuit based switching system dedicated to processing voice calls in a manner known in the art. Typically, the paths within path set $14_1$ comprise voice trunks, typically of DS0 (64 kbps) bandwidth, multiplexed into a higher bandwidth DS1 or DS3 arrangement. Switching system $10_2$ illustratively is a packet switching system that includes an ATM switching fabric $12_2$ (or, alternatively, a frame relay, or a packet switching system). Each of the paths within path set $14_2$ comprises a virtual connection (or channel) bundled into a virtual path with transmission rate of DS1, DS3, OC1, or OC3 bandwidth, for example. Switching system $10_3$ includes a fabric $12_3$ that terminates wireless transmission of the type used in connection with cellular or Personal Communications System (PCS) calls. Each of the paths within path set $14_3$ associated with switching fabric $12_3$ comprises a radio frequency channel. As is known in the art, since each of the switching systems terminate different transmission types (e.g., packet, circuit, wireless), adaptation devices (not shown) are required to interconnect the switching fabrics.

As indicated above, in the current art, an individual switching system that respectively contains one of switching fabrics $12_1$, $12_2$, and $12_3$ is commonly self-contained, in the sense that the fabric platform controller of each switching system performs call control, signaling processing, and routing processing. This functionality is replicated in each switching system and not commonly shared with other switching systems. For example, the switching system $10_3$ may have at least one service circuit 16 associated therewith that is not contained in the other switching systems for performing operations such as announcements, digit collection and/or voice recognition. Because the switching systems are different, the control capabilities that are necessary are also different from switching system to switching system, and the means for performing such control are different. Moreover, the software that is written to perform call control functions in one switching system typically cannot be re-used in another switching system.

In accordance with the principles disclosed herein, an enhanced network arrangement is realized by de-coupling some of the call processing, service processing, signaling message processing, address translation, and routing processing from the switching systems, and generalizing the interface between the switching systems and the common control. This allows for common control of a switching system and, in the case of FIG. 1, for common control of the switching systems $10_1$, $10_2$, and $10_3$. Thus, in FIG. 1, common control is performed in a Switch Processing Platform (SPP) 17, and to enhance flexibility, the switching systems are connected to each other via inter-fabric trunks 18.

The SPP 17 typically comprises one or more processors and associated peripherals (not shown) which collectively perform call processing, service processing, signaling message processing, address translation, and routing for the switching systems $10_1$, $10_2$, and $10_3$. For example, the SPP 17 performs at least some call processing associated with signaling on-hook and off-hook conditions, as well as signaling associated with call setup and tear-down. It also controls call handling activities such as requests for playing announcements, collecting digits, voice recognition, etc. Further, in association with common control there may be a request for OAM&P activities, and in response, the SPP 17 generates commands requesting events and event reporting. In short, any control function that is currently accomplished within a switching system can be migrated to, and common within to the SPP 17.

Referring to FIG. 1, a Fabric Application Interface (FAI) layer 29, in the form of set of control channels or communication links for passing commands, couples a Request Manager (RM) 32 (described in greater detail below) within the SPP 17 to each of a plurality of fabric platform controllers $15_1$, $15_2$, and $15_3$, and a Service Platform Controller (SPC) 35. The FAI layer 29 uses a layered protocol of the type used in ISDN or ATM interfaces as are known in the art. The SPC 35 controls a service circuit 36 that is independent of the switching systems. Like the service circuit 16 associated with the switching system $10_3$, the service circuit 36 performs one or more service functions such as announcements, digit collection and/or voice recognition. While FIG. 1 illustrates a single independent service circuit 36 and associated service platform controller 35, the network 10 could easily include multiple independent service circuits, each having an associated service platform controller and command translator.

Figure 2:
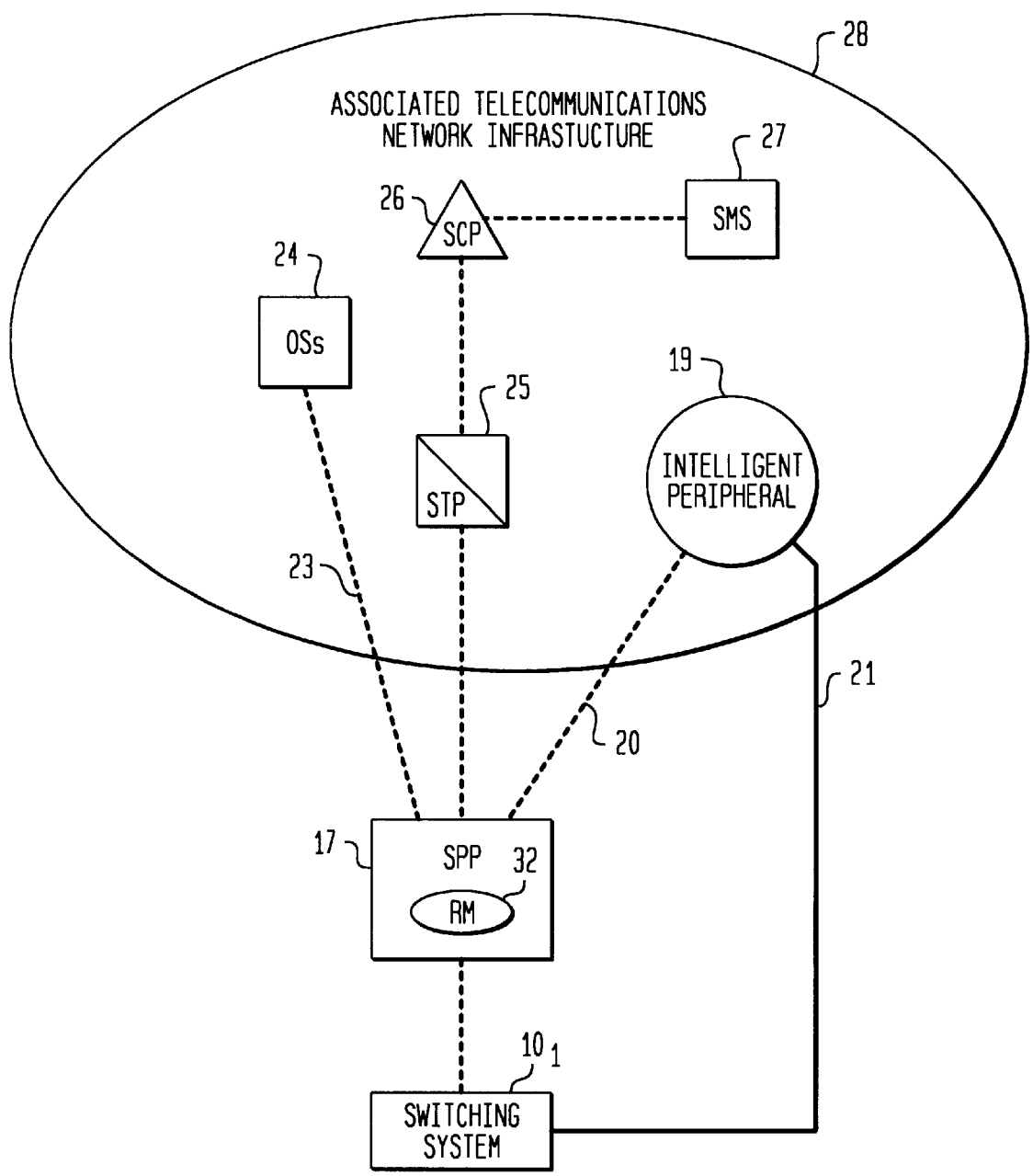
FIG. 2 illustrates the infrastructure associated with a switch processing platform comprising a part of the network of FIG. 1.

Referring to FIG. 2, to facilitate call processing and control, the SPP 17 may be linked to an intelligent peripheral 19, such as a processor or the like, via a trunk 20 for the purpose of exchanging either voice band or data signals. One or more of the switching systems, such the switching system $10_1$ may also be linked to the intelligent peripheral 19 via a trunk 21. Such intelligent peripherals are well known in the art. Additionally, the SPP 17 may be linked via a Signal Transfer Point 25 (STP) that receives and transmits signaling messages to and from at least one Service Control Point (SCP) 26 linked to a Service Management System (SMS) 27. The SPP 17 may receive a call processing request via the STP 25, or from one of the switching systems, as will be discussed below. The nature of the STP 25, SCP 26 and SMS 27 are all well known in the telephony art. Also, the SPP 17 may be linked by a trunk 23 to one or more Operation Systems (OSs) 24, as are well known in the art. The combination of these elements are hereinafter referred to as an associated telecommunications network infrastructure 28 For further information concerning the OS 24, STP 25, SCP 26 and SMS 27, reference should be had to the document *Advanced Intelligent Network (AIN)*, 0.1 Switching System Generic Requirements, TR-NWT-001284, Issue 1, August 1992, Bellcore, Redbank, N.J., pages 1-1 through 1-4 (incorporated by reference herein).

Figure 3:
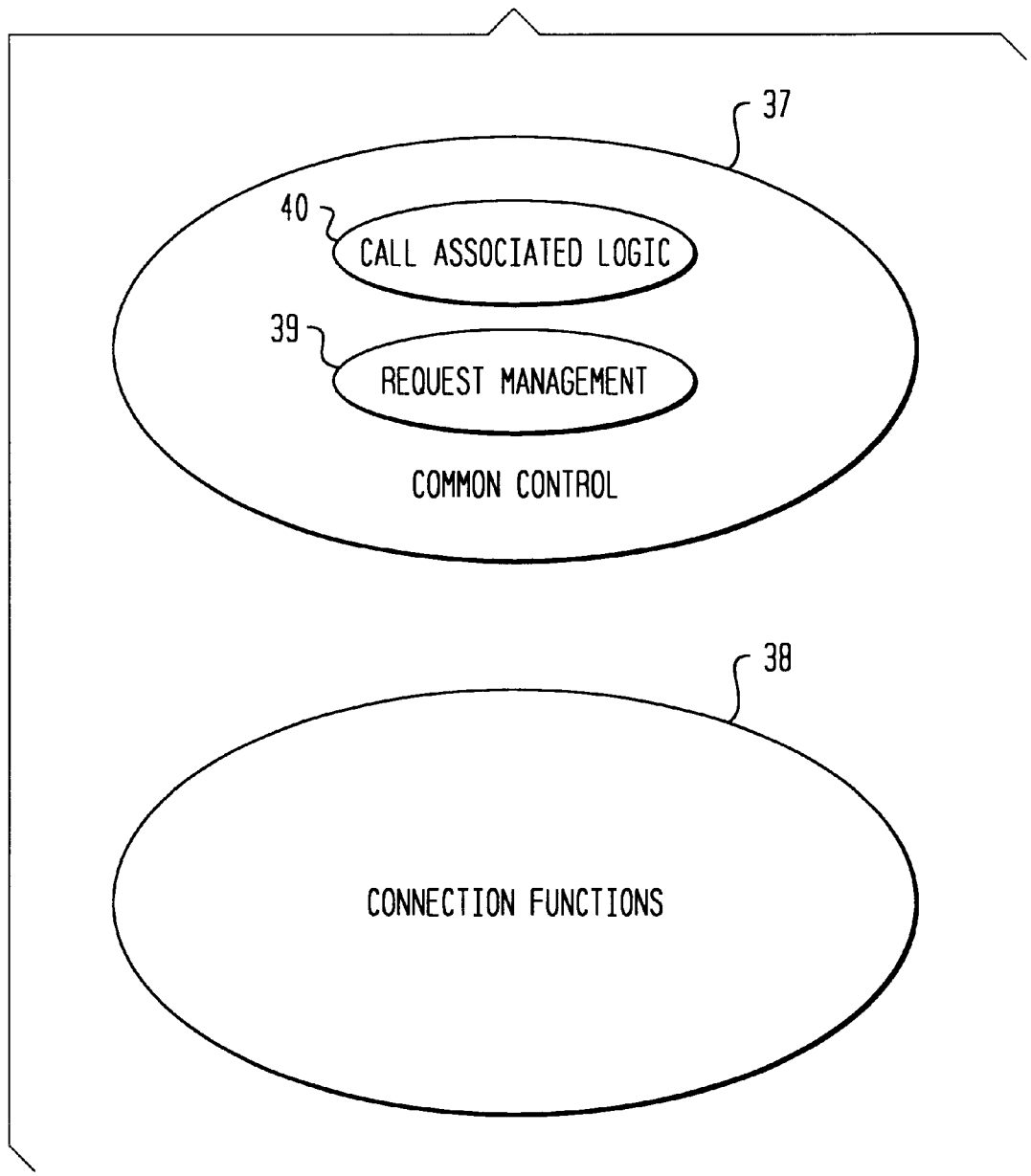
FIG. 3 illustrates the separation of command control functions from connection functions in the network of FIG. 1.

FIG. 3 shows the logical separation of common control functions 37 from the connection function 38. The common control functions include a Request Management (RM) function 39 performed by the RM 32, and call associated logic function 40. Referring to FIG. 1, in order to couple generic commands of the SPP 17 through the FAI 29 to switching systems $10_1$–$10_3$, it is desirable for the RM 32 to distribute (direct) such commands to the switching systems. Additionally, Command Translators (CT), such as CTs $34_1$–$34_2$, may be required to translate commands from the RM 32 into a form that can be processed by one or more of the Fabric Platform Controllers $15_1$–$15_3$. As shown in FIG. 1, it may be desirable for some switching systems, such as the switching system $10_1$, to accomplish the translation function by way of an associated CT $34_1$ within the SPP 17. In the case of the switching system $10_3$, it may be desirable to accomplish the translation function within the switching system itself by way of CT $34_2$. Whether the CT function resides in the SPP or the switching system is an implementation decision based on available processing capacity of the SPP and the switching system, economic analysis, and other such factors familiar to one skilled in the art. Indeed, one or more of the switching systems, such as switching system $10_2$, may be of a construction that does not require command translation. Hence, such switching systems are devoid of any CT.

The common control function 37 performed by the SPP 17 for the switching Systems $10_1$–$10_3$ of FIG. 1 is distinguished from the connection functions 38 performed by each switching fabric itself. The call associated logic function 40 is the processing undertaken by the SPP 17 of FIG. 1, either by itself, or in combination with its associated telecommunications network infrastructure 28 shown in FIG. 2, for processing a call to completion. The call associated logic includes the actual processing of the call itself, (i.e., the decision making associated with the course of action needed for completion of a particular call). The call processing also includes the necessary logic associated with the needed course of action for the call, the necessary call signaling, as well as the required call routing and any necessary Operations, Administration, Maintenance and Provisioning (OAM&P) activities. The Request Management function, which is performed by the RM 32 of FIG. 1, includes the distribution of generic commands generated by the SPP 17 to effect call processing that are ultimately transmitted to the switching fabrics $12_1$–$12_3$ and the service circuit 36 of FIG. 1 and the receipt of condition information from the switching systems and the service circuit. When the switching systems and the service circuit are responsive to the common set of the generic commands, the type of switching systems and service circuit being controlled need not be considered by the SPP.

The Command Translation function, which is performed by the CTs $34_1$–$34_2$ of FIG. 1, includes the translation of generic commands (generated by the SPP 17 and distributed by the RM 32) into native commands for execution by the corresponding fabric platform controllers $15_1$–$15_3$ and the service platform controller 35. The communication between each fabric platform controller within a switching system, and the associated switching fabric could include binary digits in electrical or optical form, electrical signals or a message language that involves native commands. In this regard, native commands are defined to include these, and any other mechanisms that are or could be used for communication between the switching fabric and its associated control mechanism The Command Translation function also includes the translation by the CTs $34_1$–$34_2$ of condition information generated by the fabric platform controllers $15_1$–$15_3$ and the service platform controller 35 which is intended for transfer to the SPP 17. As indicated above, the switching systems could easily be of a construction such that translation is not necessary. In other words, one or more switching systems could accept and act upon the generic commands from the RM 32 without any need for translation.

As indicated above, the generic commands are communicated from SPP 17, via the RM 32 and the CTs $34_1$–$34_2$ (as necessary), to instruct the switching fabrics $12_1$–$12_3$ to effect call completion, either alone, or in combination with the service circuit 36 of FIG. 1. Depending on the nature of the particular switching system, such generic commands may include preparing for an incoming call, reserving a resource, and releasing that resource. Condition information communicated from a switching fabric, via its fabric platform controller, to SPP 17 may include commands that acknowledge a connection and that acknowledge release of a connection. The foregoing is merely exemplary of the generic commands communicated between the SPP 17 and the switching systems. Depending on the particular nature of the switching system, other generic commands may be sent by the SPP 17 and other generic condition information may be sent by the switching systems to effect a particular call control operation or to signal a particular condition. For example, different commands may be needed for call control operations in a packet switching system as compared to a circuit based switching fabric. Additionally, other generic commands and condition information may be communicated in association with OAM&P activities.

Figure 4:
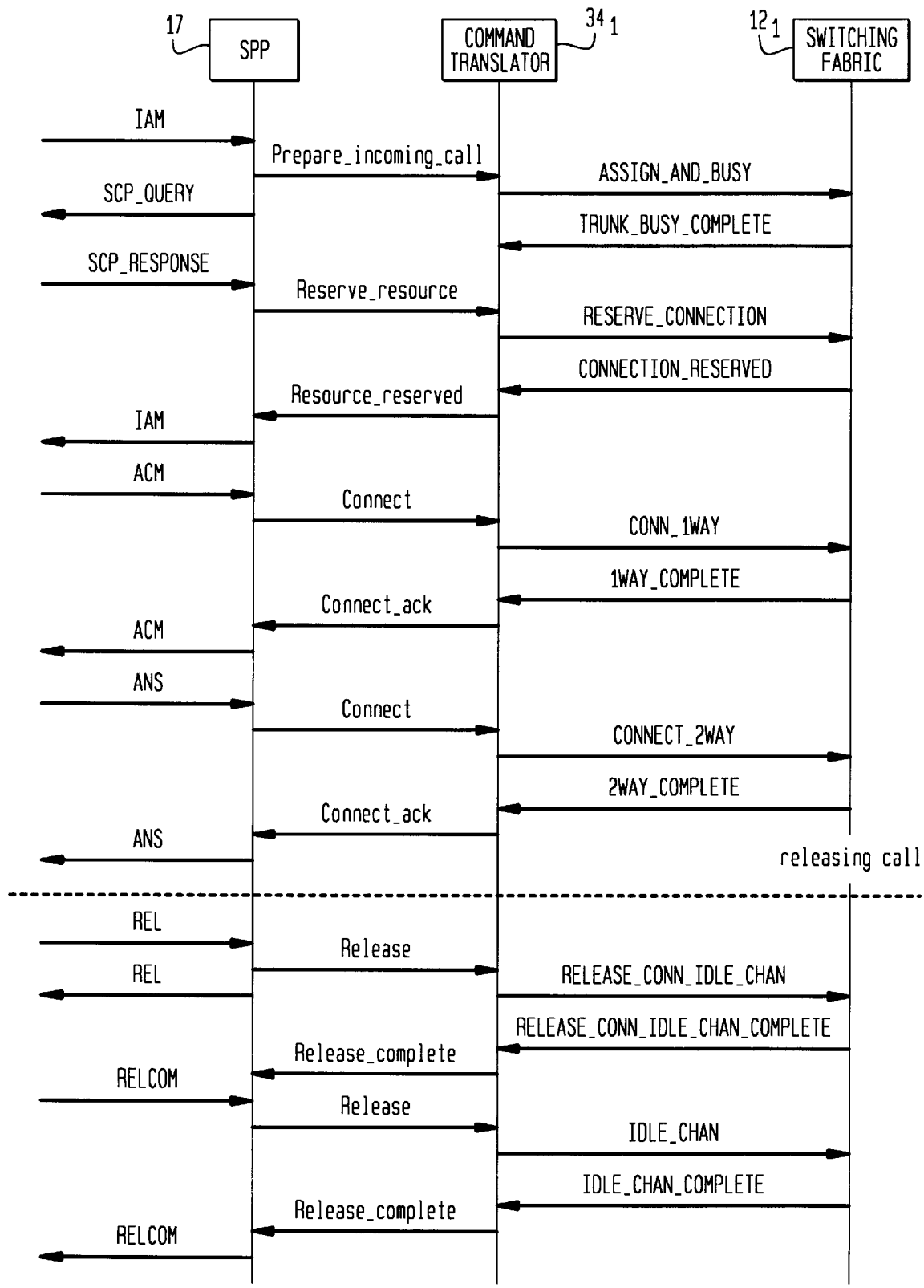
FIG. 4 is call flow diagram graphically depicting translation of generic commands into native commands and vice versa within the network of FIG. 1 to effect a conventional telephone call.

To better understand the operation of network 5, FIG. 4 graphically illustrates a sample flow of generic commands and native commands in connection with a Plain Old Telephone Services (POTS) call. This flow is illustrative and other call flows are possible. As shown in FIG. 4, call processing commences upon receipt of a request for call processing at the SPP 17. This request could be in the form of an Initial Address Message (IAM) received by the SPP 17. The IAM message constitutes one of the signaling messages generated within the associated telecommunication network infrastructure 28 that is associated with call set-up and tear-down. In particular, the IAM contains address information associated with call routing.

Upon receipt of the IAM, SPP 17 analyzes the messages, determines the call handling, and then instructs a switching system, say $10_2$, to make preparations for an incoming call via a generic command, such as Prepare__incoming__call. The CT $34_1$ translates the command into a native command, which may be in the form of optical or electrical signals, binary code or native messages such as ASSIGN__AND__BUSY to instruct the switching system to assign an incoming trunk to the call and mark the trunk for non-use by other calls. In response to this native command, the switching system assigns and makes busy the incoming trunk and returns a native command such as TRUNK__BUSY__COMPLETE. Note that a response message to the SPP 17 is optional for the Prepare__incoming__call command and has not been shown in FIG. 4. In this regard, the SPP 17 or the switching system may not have a corresponding generic or native command, respectively, which is translated by the CT $34_1$. In other words, the operation of the translation function on a particular command may be a null function.

During this call flow the SPP 17 may send a signaling command to a processor residing in its associated telecommunications network infrastructure. For example, the SPP 17 may query the SCP 26 of FIG. 2 through the STP 25 for information via a SCP__Query command to receive information, in the form of a command SCP__Response regarding the manner in which the call should be processed. Thereafter, the SPP 17 generates a generic command such as Reserve__resource which is translated by the command translator $34_1$ into a native command such as RESERVE__CONNECTION by which the switching system $10_1$ is instructed to reserve a connection through its associated switching fabric $12_1$. Note that other switching systems may have to reserve other types of resources which are associated with the switching system and/or its associated switching fabric. After the switching system has reserved the connection, the switching system responds by sending a native command such as CONNECTION__RESERVED for translation by the command translator into a generic command such as Resource__reserved. At this time, the SPP 17 sends a complete IAM.

In response to the complete IAM, SPP 17 receives from the network an Address Complete Message (ACM) acknowledging that all the needed information to complete a call has been received. For example, the switching system $10_1$ requires two phases of connections through its associated switching fabric $12_1$ and two stages of release. Thereafter, the SPP 17 instructs the switching system $10_1$ hereafter, SPP 17 instructs the switching system to establish begin its first phase of the connection procedure via the generic command Connect which the command translator translates into the native command CONN__1WAY which instructs the switching system $10_1$ to establish a one-way connection to the called party. After the switching system $10_1$ has completed such a connection, the switching system generates a native command 1WAY__COMPLETE which is translated by the command translator into the generic command Connect__ack indicating that the first phase of the connection procedure has been completed. Upon receipt of this generic command, the SPP 17 sends an ACM indicating such a connection.

If, after the switching system has established the one-way connection, the called party has answered, as indicated by an ANS signaling message received at the SPP 17, then the SPP instructs the switching system to begin its second phase of the connection procedure via the generic command via the generic command Connect which is translated by the command translator into the native command CONN2__WAY to instruct the switching system $10_1$ to establish a two-way connection between the calling and called parties. Once the switching system has established such a two-way connection, the switching system generates a native command 2WAY COMPLETE which is translated into the generic command Connect_ack which indicates to the SPP 17 that the second phase of the connection procedure has been completed. Upon receipt of this generic command, the SPP 17 generates an ANS message indicative of the existence of the two-way connection.

Once the calling or called party terminates the call, SPP 17 receives a signaling message REL to release the connection that had been set up. In response to the REL signaling message, SPP 17 generates the generic command Release to begin the first phase of the release procedure. The Release command is translated into the native command RELEASE_CONN_AND IDLE CHANNEL which instructs the switching system $10_1$ to release the initial one-way connection that had been previously reserved and to free-up the resources associated with the trunk that had been used in the one-way connection. Once the switching system has released the connection, the switching system generates the native condition information RELEASE_CONN_IDLE_CHAN_COMPLETE which is translated by the command translator into the generic condition information Release_complete that indicates to the SPP 17 that the first phase of the release procedure has been completed. In response, the SPP 17 generates the signaling messages REL indicating release of the initial one-way connection. The network then responds with a RELCOM (release complete message). In response to a RELCOM signaling message received by the SPP 17 to completely release the connection, the SPP generates the generic command Release to begin the second phase of the release procedure. The Release command is translated into the native command IDLE_CHAN to instruct the switching system $10_1$ to free-up the resources associated with the rest of the connection. Thereupon, the switching system idles the channel, following which, the switching system generates the native condition information IDLE_CHAN_COMPLETE that is translated by the command translator into the generic condition information Release_complete which indicates to the SPP 17 that the second phase of the release procedure has been completed. In response, the SPP 17 generates the signaling message RELCOM, indicating that the release of the channel has been completed.

While the call flow described with respect to FIG. 2 involves only a single switching system (i.e., $10_1$), there may be situations where it is desirable to involve several switching systems in connection with call control. Since the switching fabrics $12_1$, $12_2$, and $12_3$ are interconnected via trunks 18, the call control functionality provided by one switching system (e.g., $10_2$) can be utilized in connection with a call normally processed by another switching system (e.g., $10_1$). For example, consider a data call for INTERNET services that originated via the switching system $10_2$. In connection with such a call, one or more call control functions need to be performed and, traditionally, each switching system must be equipped with the appropriate hardware and/or software necessary to perform the required call control operations.

With the network illustrated in FIG. 1, however, a resource available in one switching system (e.g., service circuit 16 in switching system $10_3$), or an independent resource (e.g., the service circuit 36), can readily be shared with the other switching systems. Thus, in connection with the INTERNET services call originating in the switching system $10_2$, the capability of the service circuit 16 in switching system $10_3$, or the capability of the independent service circuit 36 to perform digit collection, announcement and/or voice recognition could easily be utilized via appropriate generic commands sent by SPP 17 of FIG. 1. For example, if the SPP 17 determined that digit collection must occur in connection with a call originating at a switching system, for example switching system $10_2$, the SPP may determine that such a resource (e.g., service circuit 36) exists within the switching system $10_3$. The SPP 17 then sends a commands, via the RM 32, to the switching systems $10_2$ and $10_3$ to establish a link between them for that call. In this example, the generic command sent to the switching system $10_3$ is translated via the CT $34_2$ into a native command. The SPP 17 signals the switching system $10_3$. Once the resource has responded, the SPP 17 proceeds with call processing.

Another example of the advantage of utilizing multiple fabrics in connection with call completion involves the use of the data switching system $10_2$ to control the circuit switching system $10_1$. Consider a situation where a caller using switching system $10_2$ in connection with a data call wants to initiate a voice call. In the past, the caller needed to separately actuate a telephone station set connected to switching system $10_1$ to place a voice call that carried separately over that switching system. However, a caller using the switching system $10_2$ can readily initiate a voice call by sending a request for call processing to request call associated logic (i.e., address translation, service logic and routing logic) through the switching system to the SPP 17. In response to such a request, the SPP 17 provides commands to the switching system $10_2$ to launch the desired call. The call could continue by establishing connections to a switching system within in another network. In this way, an individual using the switching system $10_2$ to access a particular web site on the INTERNET can launch a call, such as to the entity responsible for the web site or to any one else.

By way of another example, the circuit switching system $10_1$, which typically supports conferencing by way of multipoint bridges (not shown), may advantageously be used to provide such conferencing services for data applications. For example, a user of the switching system $10_2$ seeking to conference with other users in connection with a "chat-line" or a multimedia or voice conference enters an appropriate command for such a service. In response, the switching system $10_2$ signals the SPP 17 to invoke the appropriate conference service. Since that service is available in the circuit switching system, the SPP 17 signals the switching system $10_1$ to provide the requested conference service.

The network of FIG. 1 contemplates control of the switching systems by a single SPP 17. Indeed, a single SPP 17 may control the switching systems in different telecommunications networks. Referring to FIG. 5, a single SPP 17, together with its associated telecommunications network infrastructure 28 can control:

(a) the switching system 100 (having an associated telecommunications network infrastructure 101) within an Internet Network 102;

(b) the switching system 200 (having an associated telecommunications network infrastructure 201) of a wireless network 202;

(c) ATM $300_1$–$300_4$ (at least one of which has an associated telecommunications network infrastructure 301), the switching systems interconnected by an interconnection network 302 within an ATM network 303;

(d) the switching systems $400_1$–$400_4$ (at least one of which has an associated telecommunications network infrastructure 401), the switching systems interconnected by an interconnection network 402 within a local network 403; and a toll switching system 500 within a Long Distance Network.

As shown in FIG. 5, the SPP 17 may reside within the Long Distance Network 502. Alternatively, the SPP 17, could reside within any of the other networks 102, 202, 303 or 403. Further, while the SPP 17 is depicted separately from one of the switching system in the various networks, it could easily be embodied within one of the switching systems for controlling the other switching systems in the manner described above.

The SPP 17 of FIG. 5 may readily access the associated telecommunications network infrastructure of any of the switching systems within any of the different networks by making a request to the switch associated with that infrastructure. Thus, for example, the SPP 17 can readily access the associated telecommunications network infrastructure 301 associated with the switching system 300₁ within the network 303 by directing an appropriate command to that switching system. In this way, the SPP 17 need not possess any specific protocol information regarding the associated telecommunications network infrastructure 301. The SPP 17 distributes a request to the switching system 300₁ in a manner similar to which the SPP controls the switching fabric of that switch. In response to that request, the switching system 300₁ accesses its associated telecommunications network infrastructure 301 to obtain the requested information and thereafter communicates that information back to the SPP 17.

Referring to FIG. 6, it may be seen that the switching fabrics in different switching systems 600₁–600₃ can be controlled by different SPPs 17₁–17₂, each having its own associated telecommunications network infrastructure 28. For example, different ones of the SPPs 17₁–17₂ may control different ones of the switching systems 600₁–600₃. Alternatively, different ones of the SPPs 17₁–17₂ may be made responsible for specific call completion functions within the same or different switching fabrics. This partitioning of responsibility for the SPPs is applicable to switching systems residing in separate telecommunications networks, as evidenced by the network boundary between the network 600₁ and the network 600₂.

The foregoing describes a distributed telecommunications network 10 for processing a variety of calls via a common call processing intelligence afforded by one or more switch processing platforms 17—17.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A telecommunication network that includes a plurality of switching systems, each including a switching fabric for performing call connection processes and a control mechanism for the switching fabric, the improvement comprising:
    at least one switch processing platform coupled to each of the switching systems for performing at least one of a call processing, service processing, signal message processing, address translation and routing functions, and for controlling call connection processes performed by the switching fabrics by
    a) receiving a request for call processing, and
    b) responsive to the call processing request, distributing at least one command to at least one switching system through its control mechanism to command said one switching fabric to perform said call connection process.

2. The network of claim 1 where at least some of the plurality of switching fabrics are different from each other.

3. The network according to claim 2 wherein at least one of said switching fabrics is a packet switching fabric.

4. The network according to claim 2 wherein at least one of the switching fabrics is a circuit switching fabric.

5. A telecommunication network comprising:
    a plurality of switching systems, each including a switching fabric for performing call connection processes and a control mechanism for the switching fabric, wherein at least one of the switching fabrics effects call connections in a different manner than at least one other switching fabric,
    at least one switch processing platform coupled to each of the switching systems for performing call control functions, including at least one of a call processing, service processing, signal message processing, address translation and routing functions, and the switch processing platform controlling call connection processes performed by the switching fabrics by generating and generic distributing commands to the switching fabrics;
    a command translator for translating generic commands into native commands different than the generic commands to cause at least one switching fabric through its associated control mechanism to perform a call connection process;
    a resource associated with said one switching fabric;
    wherein said switch processing platform is responsive to an indication that one switching fabric requires access to said resource to complete a call connection process and wherein said processor assigns said resource to said requesting switching fabric; and
    further comprising at least one path between at least two switching fabrics, and wherein switch processing platform instructs said one switching fabric that requires access to said resource to supply information across said path to said one switching fabric associated with said resource.

6. A telecommunication network comprising:
    a plurality of switching systems, each including a switching fabric for performing call connection processes and a control mechanism for the switching fabric, wherein at least one of the switching fabrics effects call connections in a different manner than at least one other switching fabric,
    at least one switch processing platform coupled to each of the switching systems for performing at least one of a call processing, service processing, signal message processing, address translation and routing functions, and the switch processing platform controlling call connection processes performed by the switching fabrics by generating and distributing commands that are generic to the switching fabrics; and
    a command translator for translating generic commands into native commands different than the generic commands to cause at least one switching fabric through its associated control mechanism to perform a call connection operation.

7. The network of claim 6 further including a resource and wherein said switch processing platform is responsive to a request indicating that one switching fabric requires access to said resource to complete a call processing operation and wherein said switch processing platform assigns said resource to said requesting switching fabric.

8. The network of claim 7 wherein said resource assigned by said switch processing platform is a resource that is not part of said one switching fabric.

9. The network of claim 7 wherein said resource assigned by said control switch processing platform is associated with said one switching fabric.

10. The network of claim 6 including a plurality of switch processing platforms each primarily responsible for a different subset of said plurality of switching fabrics, such that each subset of the switching fabrics is assigned at least one resource by its responsible switch processing platform to assist said subset of switching fabrics in the performance of call connection operations.

11. The network according to claim 7 wherein said resource comprises a service circuit.

12. The network according to claim 6 wherein:
the switching fabrics generate native commands;
the switch processing platform is responsive to generic commands derived from native commands from the switching fabrics;
wherein the switch processing platform has associated therewith a request manager for producing generic commands derived from native commands received from said switching fabrics and for distributing generic commands from the switch processing platform to the switching fabrics; and
wherein the command translator means translates native commands generated by each switching fabric into generic commands for receipt by the request manager and for translating each command from request manager into a native commands for receipt by the switching fabrics through their associated control mechanisms.

13. The network according to claim 6 wherein at least one switching fabric is a packet switching fabric.

14. The network according to claim 6 wherein at least one switching fabric is a circuit switching fabric.

15. The network according to claim 6 wherein at least one switching fabric comprises a wireless switching fabric.

16. The network according to claim 13 wherein a second switching fabric is a circuit switching fabric.

17. A method for processing calls in a distributed communications network comprising the steps of:
providing a switch processing platform that performs at least one of call processing, service processing, signal message processing, address translation and routing functions, the switch processor platform coupled to a plurality of switching systems, each including a switching fabric for performing call connection processes and a control mechanism for the switching fabric;
receiving at the switch processing platform a request for call processing and generating at least one a command to instruct at least one switching fabric of at least one switching system through its control mechanism to perform at least one call connection process;
directing to said one switching system said command; and
executing, at said switching system, said command to perform said one call connection operation.

18. The method according to claim 17 further including the step of producing at one switching fabric request for receipt by the switch processing platform to invoke a call connection operation by another switching fabric.

19. The method according to claim 18 wherein the invoked call connection operation includes digit collection.

20. The method according to claim 18 wherein the invoked call connection operation includes voice recognition.

21. The method according to claim 18 wherein the invoked call connection operation includes providing an announcement.

22. The method according to claim 18 wherein the invoked call connection operation includes launching a call in another switching fabric.

23. A distributed communications network, comprising:
at least a first and second networks, each comprising:
a plurality of switching systems, each including a switching fabric for performing call connection processes by finding, reserving, and connecting communications paths and a control mechanism for the switching fabric;
at least one switch processing platform for performing at least one of a call processing, service processing, signal message processing, address translation and routing functions and for accepting a request for call processing, and, in response to said request, distributing at least one command to at least one switching system in said one network to command at least one switching fabric to perform said call connection process;
wherein each switch processing platform in each network is connected to at least one switching system in another other network so that each switch processing platform can pass commands to its own -network, as well as to at least one other network.

24. A distributed communications network, comprising:
at least a first and second networks, each comprising:
at least one switching system that includes a switching fabric for performing call connection processes by finding, reserving, and connecting communications paths, and a control mechanism for the switching fabric;
wherein the improvement comprises
at least one switch processing platform for performing at least one of a call processing, service processing, signal message processing, address translation and routing functions and for accepting a request for call processing, and, in response to said request, distributing at least one command to at least one switching system in said one network to command at least one switching fabric to perform said call connection process.

25. The network according to claim 24 wherein at least one of said networks comprises a plurality of interconnected switching systems.

26. The network according to claim 24 wherein the switch processing platform associated with one of the-networks.

27. A method for processing calls in a distributed communications network that includes a switch processing platform that performs at least one of a call processing, service processing, signal message processing, address translation and routing functions, the switch processor platform coupled to a plurality of switching systems, each switching system including a switching fabric for performing call connection processes and a control mechanism for the switching fabric, and an associated telecommunications network infrastructure separate from the switch processing platform, the method comprising the steps of:
initiating a request within one of the switch processing platform and the switching systems to obtain information from the telecommunications network infrastructure associated a different switching systems than said one switching system;
distributing the request from the switch processing system to said different switching system;
obtaining from said telecommunications network infrastructure through the different switching system the information sought by the switch processing platform; and
communicating from said different switching system to the switch processing platform the information from said associated telecommunications network infrastructure.

* * * * *